US007853283B2

(12) United States Patent
Usuda et al.

(10) Patent No.: US 7,853,283 B2
(45) Date of Patent: Dec. 14, 2010

(54) TRANSMISSION POWER CONTROL METHOD, MOBILE STATION, RADIO BASE STATION, AND RADIO NETWORK CONTROLLER

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 484 days.

(21) Appl. No.: 11/886,320

(22) PCT Filed: Mar. 17, 2006

(86) PCT No.: PCT/JP2006/305430

§ 371 (c)(1),
(2), (4) Date: Nov. 26, 2007

(87) PCT Pub. No.: WO2006/098440

PCT Pub. Date: Sep. 21, 2006

(65) Prior Publication Data

US 2008/0207243 A1  Aug. 28, 2008

(30) Foreign Application Priority Data

Mar. 18, 2005  (JP)  ............................. P2005-080716

(51) Int. Cl.
*H04B 7/00* (2006.01)
*H04Q 7/20* (2006.01)

(52) U.S. Cl. ...................... 455/522; 455/69; 455/67.11; 455/24

(58) Field of Classification Search .................. 455/522, 455/69, 450, 452.1, 455, 509, 453, 24, 515, 455/516, 517, 67.11, 67.13, 126; 370/329
See application file for complete search history.

(56) References Cited

U.S. PATENT DOCUMENTS 6,747,963 B1  6/2004  Park et al.
6,917,607 B1  7/2005  Yeom et al.

7,006,482 B1  2/2006  Choi et al.

(Continued)

FOREIGN PATENT DOCUMENTS

EP  1 508 978 A1 *  2/2005

(Continued)

OTHER PUBLICATIONS

3GPP TS 25.309 V6.1.0 (Dec. 2004), 3rd Generation Partnership Project; Technical Specification Group Radio Access Network; FDD Enhanced Uplink; Overall description; Stage 2. (Cont.) Release 6, p. 1-26.

(Continued)

*Primary Examiner*—John Lee
(74) *Attorney, Agent, or Firm*—Marvin A. Motsenbocker; Mots Law, PLLC (57) ABSTRACT

The present invention relates to a transmission power control method which controls a transmission power of uplink user data for transmitting an uplink user data from a mobile station to a radio base station. The transmission power control method according to the present invention includes: transmitting, from the mobile station to the radio base station, a transmission data block which includes control information periodically, even when user data to be transmitted has not existed in a transmission buffer of the mobile station; notifying, at the radio base station, the number of retransmissions of the transmission data block, to a radio network controller; determining, at the radio network controller, a target SIR of a dedicated physical control channel in the radio base station based on the notified number of retransmissions and notifying the determined target SIR to the radio base station; controlling, at the radio base station, a transmission power of the dedicated physical control channel in the mobile station based on the notified target SIR; and determining, at the radio network controller, a transmission wave amplitude ratio between the uplink user data channel and the dedicated physical control channel based on the notified number of retransmissions and notifying the determined transmission wave amplitude ratio to the mobile station.

3 Claims, 8 Drawing Sheets

U.S. PATENT DOCUMENTS

| | | |
|---|---|---|
| 7,113,496 B2 * | 9/2006 | Koo et al. .................... 370/335 |
| 2002/0077141 A1 * | 6/2002 | Hwang et al. ................ 455/522 |
| 2005/0047416 A1 | 3/2005 | Heo et al. |
| 2005/0078651 A1 | 4/2005 | Lee et al. |

FOREIGN PATENT DOCUMENTS

| | | |
|---|---|---|
| EP | 01508978 | 2/2005 |
| JP | 2002-026747 A | 1/2002 |
| JP | 2002-171557 A | 6/2002 |
| JP | 2002542659 A | 12/2002 |
| JP | 2003501876 A | 1/2003 |
| JP | 2003511898 A | 3/2003 |
| JP | 2004-080531 A | 3/2004 |
| JP | 2005-005762 | 1/2005 |
| JP | 2005-501474 | 1/2005 |
| JP | 200565298 A | 3/2005 |
| JP | 2005073276 A | 3/2005 |
| WO | WO 01/24402 A1 | 4/2001 |
| WO | WO 03/019844 A2 | 3/2003 |
| WO | 2004098092 A1 | 11/2004 |

OTHER PUBLICATIONS

3GPP TSG RAN 2 #47, R2-051399, NTT DoCoMo, Inc., "Outer loop power control in case no DCHs are mapped to DPDCH", 12.2, Open Item:3, Athens Greece, May 9-13, 2005, p. 1-2.

3GPP TSG-RAN WG2 Meeting #46bis, R2-050937, Ericsson, "Outer loop power control for E-DCH", Beijing, China, Apr. 4-8, 2005, p. 1-2.

3GPP TSG RAN WG1 Meeting #40bis, R1-050348, Lucent Technologies, "E-DPCCH Gain Factor Settings over Re-transmissions", Beijing, China, Apr. 4-8, 2005, p. 1-3.

TSG-RAN Working Group 2#44, R2-042010, NEC, "Outer Loop Transmission Power Control in Enhanced Uplink", Sophia Antipolis, France, Oct. 4-8, 2004, p. 1-3.

* cited by examiner

TRAFFIC ORIGINATED

⬛ DATA OF MOBILE STATION A
☐ DATA OF MOBILE STATION A

RADIO TRANSMISSION (b)

WHEN TRANSMITTING AT LOW-SPEED RADIO RESOURCE (c)

WHEN TRANSMITTING AT HIGH-SPEED RADIO RESOURCE

TRANSMISSION POWER CONTROL METHOD, MOBILE STATION, RADIO BASE STATION, AND RADIO NETWORK CONTROLLER

TECHNICAL FIELD

The present invention relates to transmission power control methods, mobile stations, radio base stations, and radio network controllers, which control transmission power of uplink user data channel for transmitting uplink user data from the mobile stations to the radio base stations.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

Figure 1:
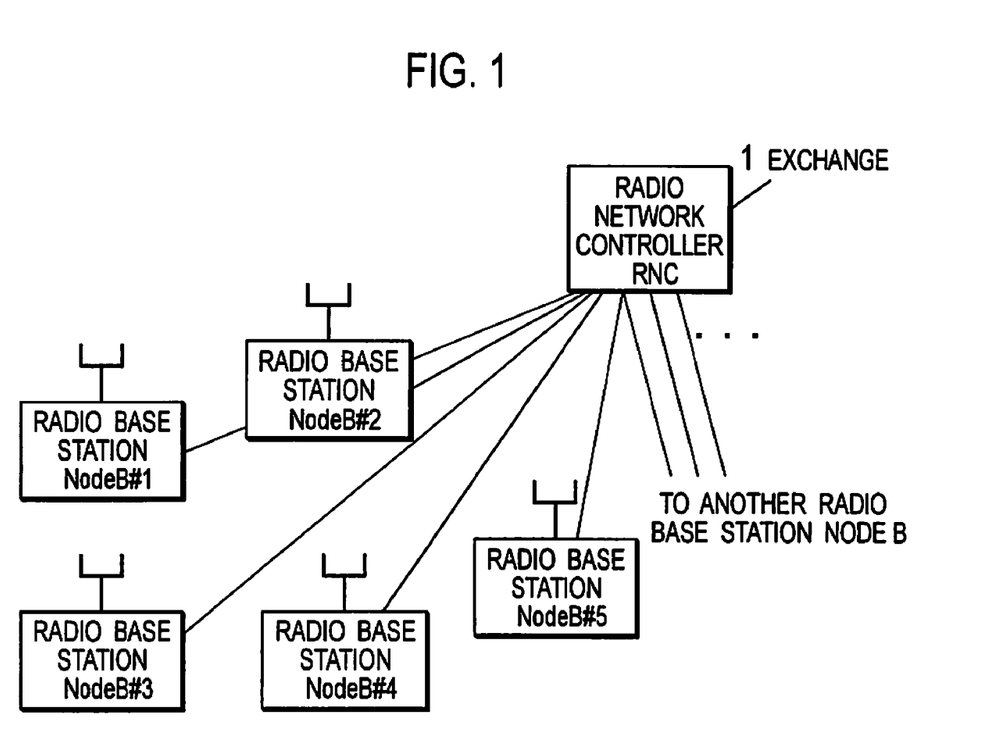
FIG. 1 is a block diagram of a transmission power control system according to an embodiment of the present invention.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Figure 2:
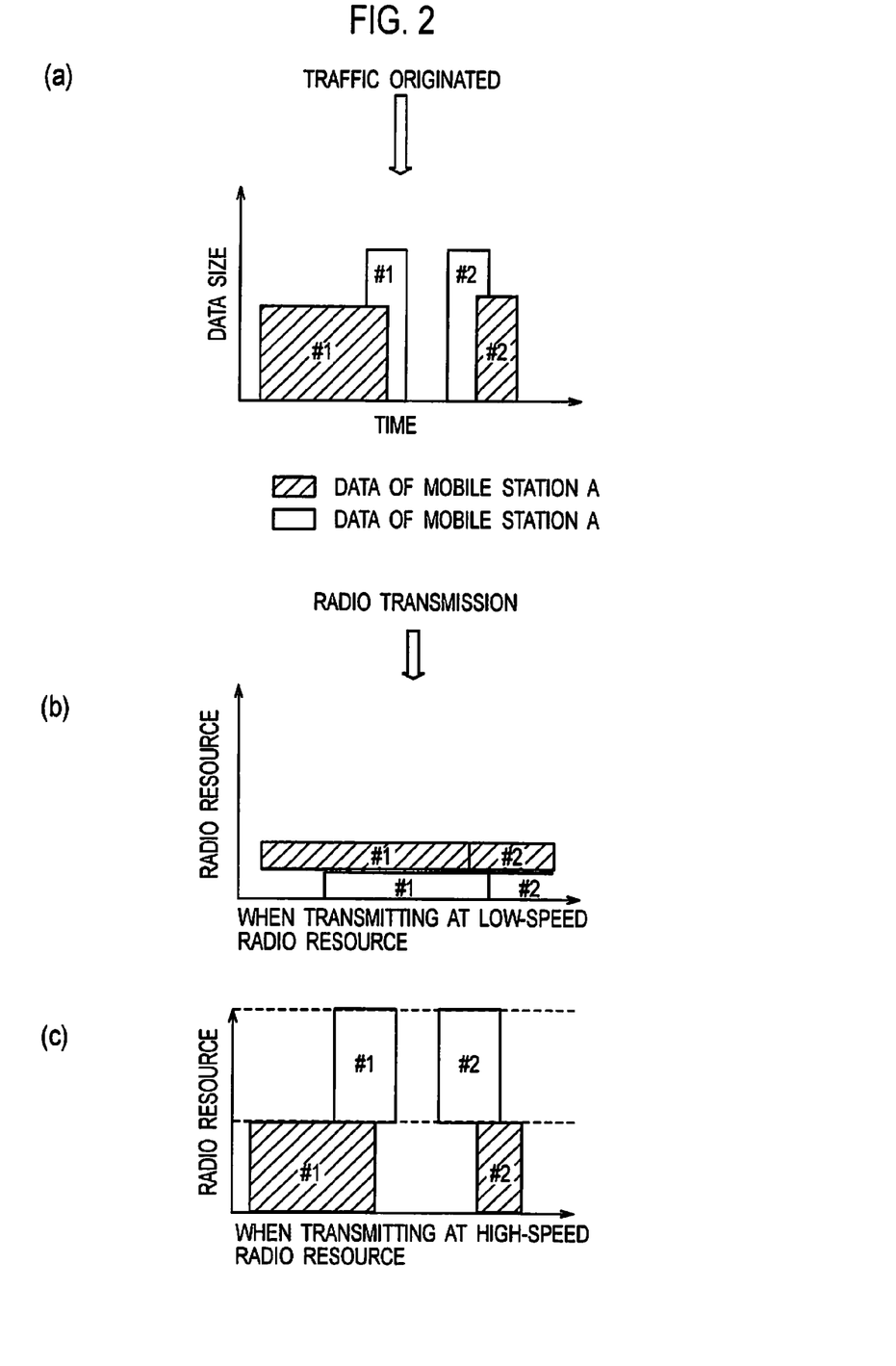
FIGS. 2(a) to (c) are diagrams for illustrating data transmission of a mobile station according to an embodiment of the present invention.

Accordingly, in the conventional mobile communication system, when burst data transmission is performed as shown in FIG. 2(a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 2(b) and (c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE, which is allowed to transmit user data, and a transmission rate of user data, per a predetermined timing, so as to notify a mobile station ID as well as the information relating to the transmission rate of the user data (or a maximum allowable transmission rate of user data).

The mobile station UE designated by the radio base station Node B transmits user data at the designated timing and the transmission rate (or within a range of the maximum allowable transmission rate).

Second, a radio resource control method that is referred to as "Rate Control per UE" has been discussed.

In such a radio resource control method, if there is user data that should be transmitted to the radio base station Node B, each mobile station UE can transmit the user data. However, regarding the maximum allowable transmission rate of the user data, the transmission rate determined by the radio base station Node B and notified to each mobile station UE for each transmission frame or each of a plurality of transmission frames, is used.

Here, when notifying the maximum allowable transmission rate, the radio base station Node B notifies the maximum allowable transmission rate itself at the timing, or a relative value thereof (for example, an "Up command", a "Down command", and a "Hold command").

Third, a radio resource control method that is referred to as "Rate Control per Cell" has been discussed.

In such a radio resource control method, a radio base station Node B notifies a transmission rate of user data, which is common among mobile stations UE in communication, or information required to calculate the transmission rate, so that each mobile station UE determines a transmission rate of user data based on the received information.

Ideally, the "Time & Rate Control", and the "Rate Control per UE" can be the best control method for improving radio capacity in an uplink. However, a transmission rate of user data has to be granted after data volume stored in buffers of the mobile station UE, transmission power in the mobile station UE, or the like are grasped. Therefore, there has been a problem that control load is increased by the radio base station Node B.

In addition, in these radio resource control methods, there has been a problem that overhead becomes larger by exchanges of control signals.

On the other hand, in the "Rate Control per Cell", there is an advantage in that control load by the radio base station Node B is small since the radio base station Node B notifies information which is common in cells, and each mobile station UE autonomously seeks the transmission rate of user data based on the received information.

However, the radio base station Node B has to be configured in such a manner that the user data in the uplink from any mobile station UE can be received. Therefore, there has been a problem that an apparatus size of radio base station Node B becomes large to effectively utilize the radio capacity of the uplink.

Accordingly, there has been proposed, for example, a method (Autonomous ramping method) that the mobile station UE increases the transmission rate of user data from a pre-notified initial transmission rate in accordance with pre-determined rules so that excessive allocation of radio capacity by the radio base station Node B can be prevented, thereby preventing increase of the apparatus size of radio base station Node B, as described in Non-patent Document 1.

In such a method, a radio base station Node B determines a maximum allowable transmission rate (or a parameter relating to the maximum allowable transmission rate, the same shall apply hereinafter) based on hardware resources or radio bandwidth resources (for example, an interference volume in an uplink) in each cell, so as to control the transmission rate of user data in communicating mobile stations UE. Detailed descriptions of a control method based on hardware resources and a control method based on an interference volume in an uplink will be given below.

In the control method based on the hardware resources, a radio base station Node B is configured to notify a maximum allowable transmission rate to a mobile station UE connected to a cell under the control thereof.

The radio base station Node B lowers the maximum allowable transmission rate so as to avoid shortage of the hardware resources when the transmission rate of user data in the mobile station UE connected to the cell under the control thereof is increased and the hardware resources are insufficient.

On the other hand, the radio base station Node B again increases the maximum allowable transmission rate when the space of the hardware resources becomes larger, such as when the user data transmission in the mobile station UE connected to the cell under the control thereof has been completed, or the like.

In addition, in the control method based on the interference volume in the uplink, a radio base station Node B is configured to notify a maximum allowable transmission rate to a mobile station UE connected to a cell under the control thereof.

Figure 3:
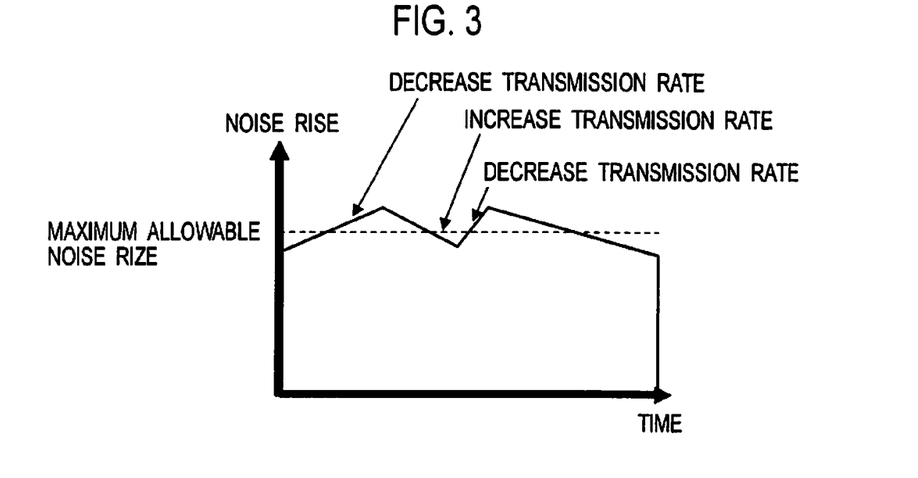
FIG. 3 is a graph for showing an operation for controlling transmission rate of a mobile station in a transmission power control system according to an embodiment of the present invention.

When the transmission rate of user data in the mobile station UE connected to the cell under the control of a radio base station Node B increases and a measured interference volume (for example, a measured noise rise) in the uplink exceeds an allowable value (for example, a maximum allowable noise rise), the radio base station Node B lowers the maximum allowable transmission rate so that the interference volume in the uplink can be within a range of the allowable value (see, FIG. 3).

On the other hand, the radio base station Node B again increases the maximum allowable transmission rate when the interference volume (for example, the noise rise) in the uplink is within a range of the allowable value (for example, the maximum allowable noise rise) thereby having a space, such as when the user data transmission in the mobile station UE connected to the cell under the control of the radio base station Node B has been completed, or the like. (see, FIG. 3)

Figure 4:
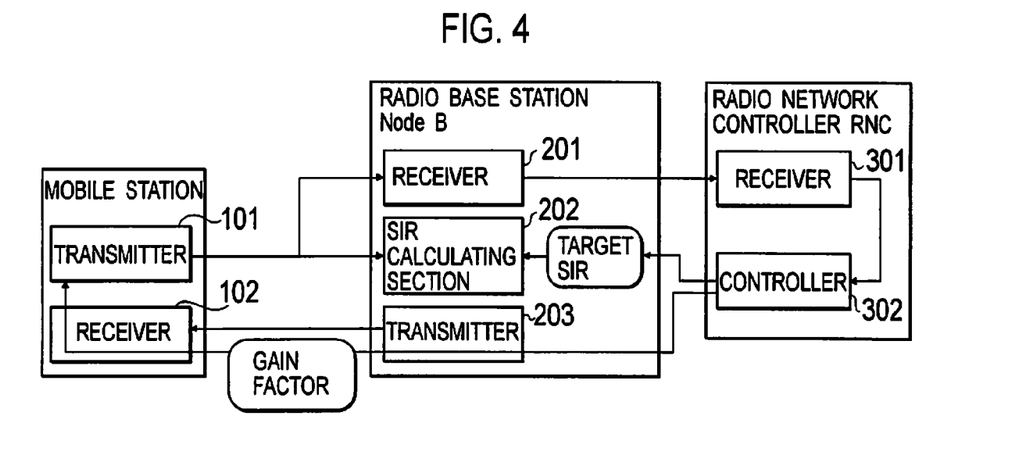
FIG. 4 is a block diagram of a transmission power control system according to an embodiment of the present invention.

Further, a transmission power control in a mobile communication system using "EUL" will be described with reference to FIG. 4. It should be noted that the configuration of the transmission power control is simplified in FIG. 4, therefore elements unnecessary for explaining the present invention such as RF section, antenna section, or the like, are omitted.

A transmitter 101 of the mobile station UE is configured to transmit always a Dedicated Physical Control Channel (DPCCH), with which a layer-1 control information such as a pilot signal, a TPC command or the like are paired.

In addition, the transmitter 101 of the mobile station UE is configured to transmit a Dedicated Physical Data Channel (DPDCH) or an Enhanced Dedicated Physical Data Channel (E-DPDCH), with which the uplink user data or the control information of above layer 2 are mapped to, in accordance with presence or absence of uplink user data that should be transmitted, or presence or absence of transmission opportunity allocation.

An SIR calculating section 202 of the radio base station Node B calculates a reception signal to interference power ratio of the received DPCH (a reception SIR), so as to compare a set target SIR with the reception SIR.

When the reception SIR is larger than the target SIR, a transmitter 203 of the radio base station Node B transmits a "Down" command to the mobile station UE. When the reception SIR is smaller than the target SIR, the transmitter 203 of the radio base station Node B transmits an "Up" command to the mobile station UE.

A series of operation described above is referred to as "inner loop transmission power control".

On the other hand, an input section 301 of the radio network controller RNC is configured to measure a reception quality of the E-DPDCH (or the DPDCH).

Then, a controller 302 of the radio network controller RNC is configured to set a target SIR of the radio base station Node B based on the measurement result, and to determine a transmission wave amplitude ratio between the E-DPDCH transmitted from the mobile station UE and the DPCCH (the above transmission wave amplitude ratio is hereinafter referred to as "gain factor"), so as to notify the determined gain factor to the mobile station UE.

A series of operation described above is referred to as "outer loop transmission power control".

In the conventional mobile communication system using "EUL", "outer loop transmission power control" is configured to be adaptable to various fluctuations in radio environment, such as when the mobile station UE shifts to a soft handover status, when the transmission rate of the mobile station UE has changed, when the radio waves are interrupted by such as buildings, or the like.

However, if user data that should be transmitted through the E-DPDCH does not exist, only "inner loop transmission power control" is performed without "outer loop transmission power control" being performed. In such a case, it is difficult to set the gain factor or the target SIR appropriately in accordance with the changing of the propagation environment. Accordingly, when the transmission is resumed, the uplink user data cannot be transmitted with appropriate transmission power. This causes problem of deterioration in the radio quality.

(Non-patent Document 1) 3GPP TSG-RAN R2-042010

DISCLOSURE OF THE INVENTION

The present invention has been made considering the above-described problems, and its object is to provide a mobile communication method, a mobile station and a radio base station that makes it possible to reduce deterioration in a radio quality caused by transmission interruption of transmission data block, by generating transmission data blocks that include control information (MAC layer control information) that stores status of the mobile station (for example, availability of the transmission power, status of the buffer, or the like) and by transmitting the generated transmission data block to the radio base station in a constant manner so as to perform an outer loop transmission power control in a constant manner, even when user data that should be transmitted does not exist in a transmission buffer of the mobile station.

A first aspect of the present invention is summarized as a transmission power control method which controls a transmission power of an uplink user data channel for transmitting an uplink user data from a mobile station to a radio base station, including: transmitting, from the mobile station to the radio base station, a transmission data block which includes control information periodically, even when the uplink user data to be transmitted has not existed in a transmission buffer of the mobile station; notifying, at the radio base station, the number of retransmissions of the transmission data block, to a radio network controller; determining, at the radio network controller, a target SIR of a dedicated physical control channel in the radio base station based on the notified number of retransmissions, and notifying the determined target SIR to the radio base station; controlling, at the radio base station, a transmission power of the dedicated physical control channel in the mobile station based on the notified target SIR; and determining, at the radio network controller, a transmission wave amplitude ratio between the uplink user data channel and the dedicated physical control channel based on the notified number of retransmissions and notifying the determined transmission wave amplitude ratio to the mobile station.

A second aspect of the present invention is summarized as a mobile station used in a transmission power control method which controls a transmission power of an uplink user data channel for transmitting uplink user data from the mobile station to a radio base station, including: a transmitter configured to transmit a transmission data block which includes control information to the radio base station periodically, even when the uplink user data to be transmitted has not existed in a transmission buffer; and a control section configured to control a transmission power of the uplink user data channel based on a transmission wave amplitude ratio between the uplink user data channel and a dedicated physical control channel and a transmission power of the dedicated physical control channel controlled by the radio base station, the transmission wave amplitude ratio notified from a radio network controller.

A third aspect of the present invention is summarized as a radio base station used in a transmission power control method which controls a transmission power of an uplink user data channel for transmitting uplink user data from a mobile station to the radio base station, including: a notification section configured to notify, to a radio network controller, the number of retransmissions of a transmission data block which includes control information transmitted from the mobile station; and a control section configured to control a transmission power of a dedicated physical channel in the mobile station based on a target SIR of the dedicated physical channel in the radio base station notified by the radio network controller.

A fourth aspect of the present invention is summarized as a radio network controller used in a transmission power control method which controls a transmission power of an uplink user data channel for transmitting an uplink user data from a mobile station to a radio base station, including: a notification section configured to determine, when the mobile station transmit a transmission data block which includes control information to the radio base station periodically even when the uplink user data to be transmitted has not existed in a transmission buffer of the mobile station, and when the radio base station notifies the number of retransmissions of the transmission data block to the radio network controller, a target SIR of a dedicated physical control channel in the radio base station based on the notified number of retransmissions, to notify the determined target SIR to the radio base station, to determine a transmission wave amplitude ratio between the uplink user data channel and the dedicated physical control channel based on the notified number of retransmissions, and to notify the determined transmission wave amplitude ratio to the mobile station.

DISCLOSURE OF THE INVENTION

A description will be given of a configuration of a transmission rate control system according to a first embodiment of the present invention with reference to the accompanying drawings. In the following description of the drawings, identical or similar elements are designated by identical or similar reference numerals. It is to be noted, however, that the drawings merely show schematic configurations of the present invention.

The First Embodiment

With reference to FIGS. 5 to 13, a mobile communication system according to the first embodiment of the present invention will be described.

Figure 5:
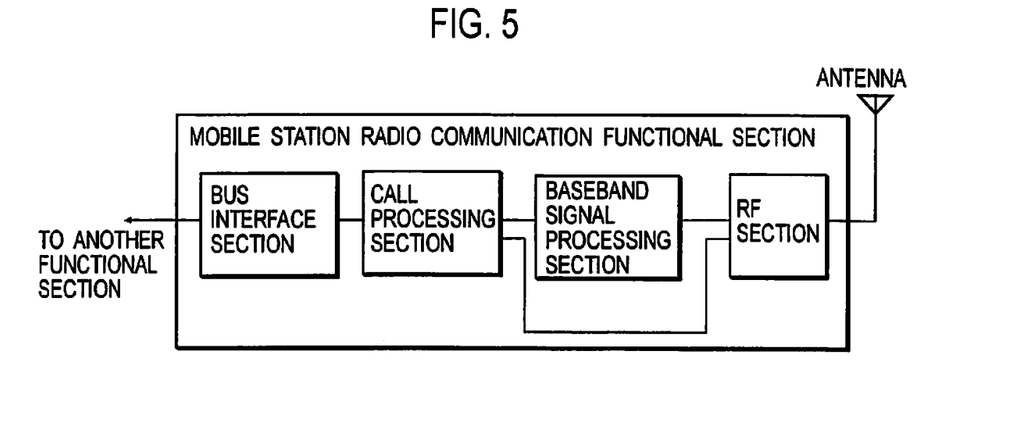
FIG. 5 is a block diagram of a mobile station radio communication functional section according to an embodiment of the present invention.

As shown in FIG. 5, a mobile station radio communication functional section of a mobile station in a mobile communication system according to the first embodiment of the present invention, is provided with a bus interface section, a call processing section, a baseband signal processing section, and an RF section.

Figure 6:
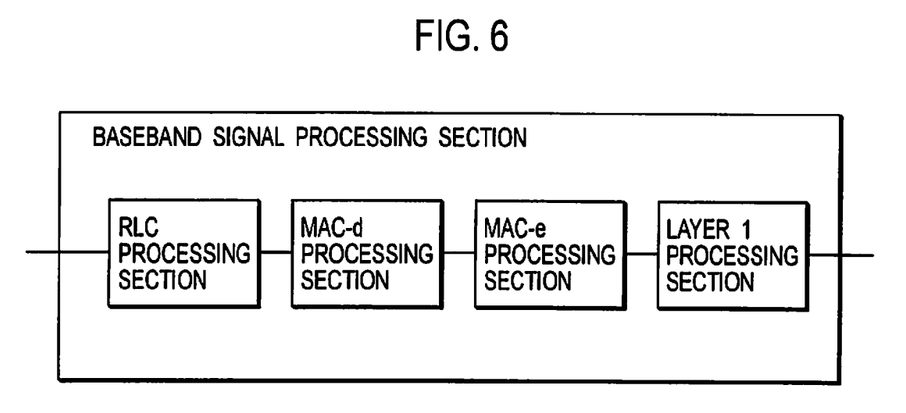
FIG. 6 is a block diagram of a baseband signal processing section according to an embodiment of the present invention.

In addition, as shown in FIG. 6, the baseband signal processing section is provided with an RLC (Radio Link Control)

processing section, a MAC-d processing section, a MAC-e processing section, and a layer-1 processing section.

Figure 7:
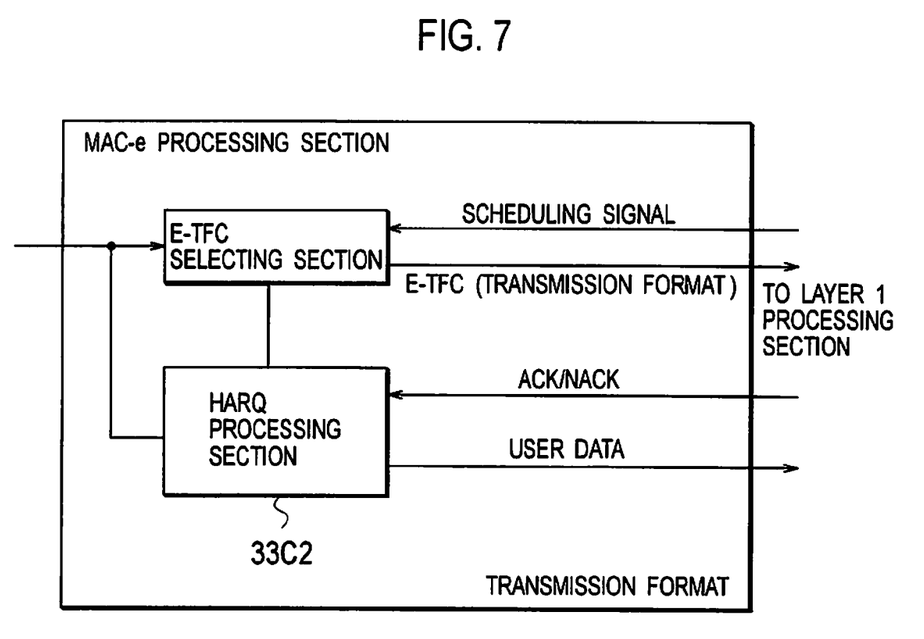
FIG. 7 is a block diagram of a MAC-e section according to an embodiment of the present invention.

In addition, as shown in FIG. 7, the MAC-e processing section is provided with an E-TFC (Enhanced Transport Format Combination) selecting section, and an HARQ (Hybrid Automatic Repeat Request) processing section.

The MAC-e processing section is configured to transmit, to the radio base station, transmission data blocks that include control information (MAC layer control information) periodically, even when user data to be transmitted has not existed in the transmission buffer.

In such a case, since user data to be transmitted has not existed in the transmission buffer, the MAC-e processing section generates a control PDU (transmission data block) that includes control information such as excessive degree of the transmission power, status of the buffer, or the like, so as to transmit the generated control PDU by performing padding process so that the control PDU reaches the preliminarily notified minimum Transport Block Size (TBS).

In addition, the MAC-e processing section is configured to control transmission power of the uplink user data channel based on a transmission wave amplitude ratio (gain factor) between the uplink user data channel (E-DPDCH) and the dedicated physical control channel (DPCCCH) notified from the radio network controller RNC, and transmission power of the DPCCH controlled by the radio base station.

Figure 8:
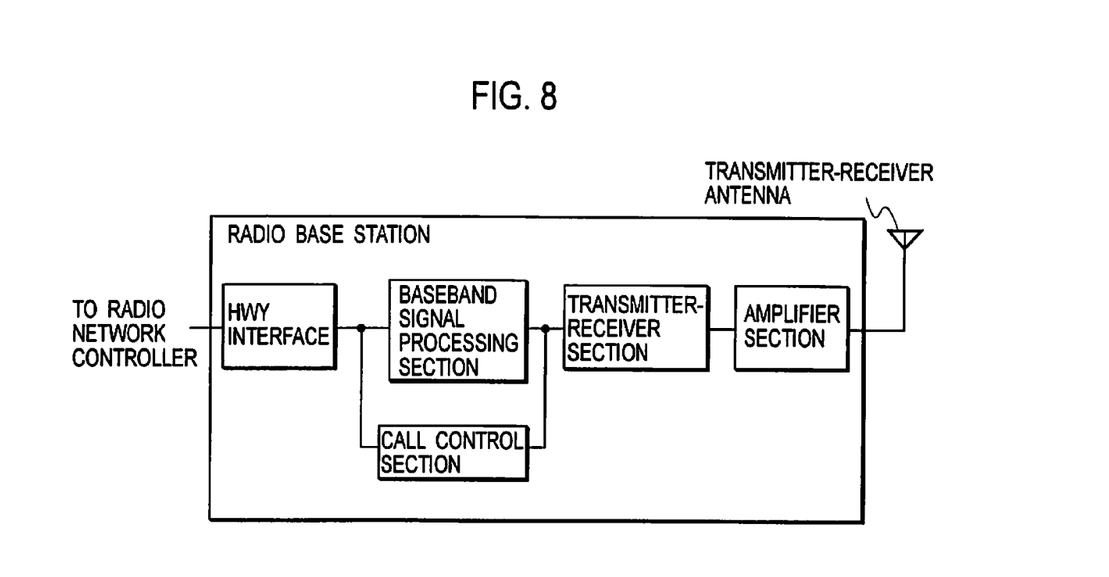
FIG. 8 is a block diagram of a radio base station according to an embodiment of the present invention.

As shown in FIG. 8, the radio base station (corresponds to each cell) of a transmission rate control system according to the first embodiment of the present invention is provided with an HWY interface, a baseband signal processing section, a call control section, a transmitter-receiver section, and an amplifier section.

Figure 9:
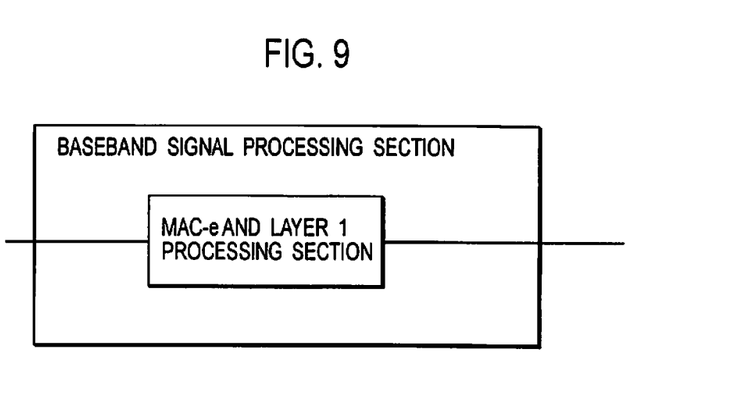
FIG. 9 is a block diagram of a baseband signal processing section according to an embodiment of the present invention.
Figure 10:
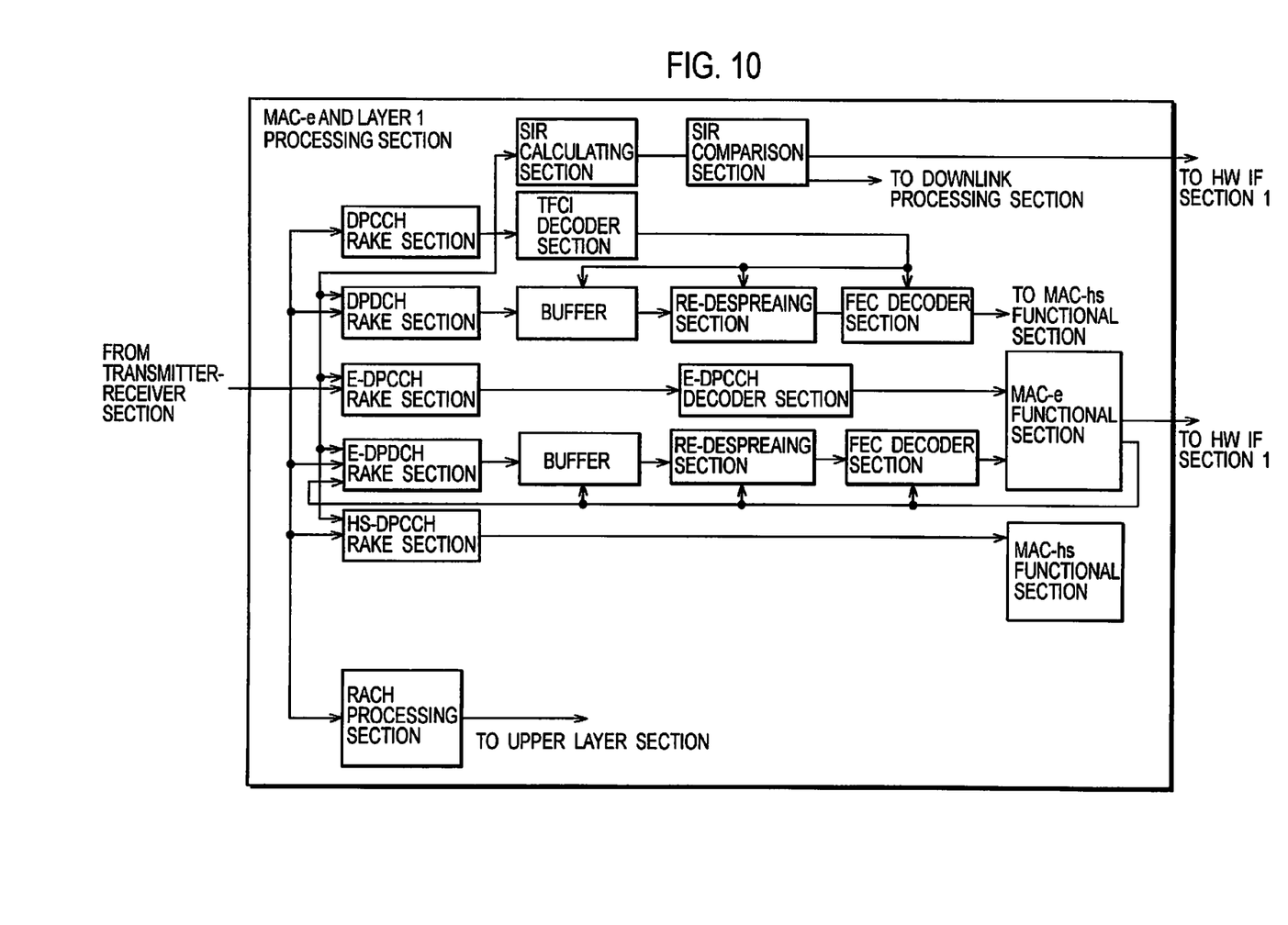
FIG. 10 is a block diagram of a baseband signal processing section according to an embodiment of the present invention.

In addition, as shown in FIG. 9, the baseband signal processing section is provided with a MAC-e and layer-1 processing section. FIG. 10 shows an example of configuration of the MAC-e and layer-1 processing section (uplink processing section) relating to the present invention.

As shown in FIG. 10, uplink data transmitted from the transmitter-receiver section is forwarded to each RAKE section.

A DPCCH RAKE section performs such as DPCCH dispreading, RAKE combining, or the like. Further, an SIR measurement section performs SIR measurement by using pilot part of the DPCCH. Then, the SIR comparison section compares the measured SIR with a target SIR.

The SIR comparison section instructs a downlink processing section of the baseband signal processing section to transmit a "Down" or an "Up" TPC command through the downlink based on a result of comparison.

In addition, the SIR comparison section is connected to the radio network controller RNC through an HWY interface. The radio network controller RNC designates the target SIR.

In other words, the radio base station controls transmission power of the DPCCH in the mobile station based on the target SIR of the DPCCH in the radio base station, which is notified from the radio network controller RNC.

Figure 11:
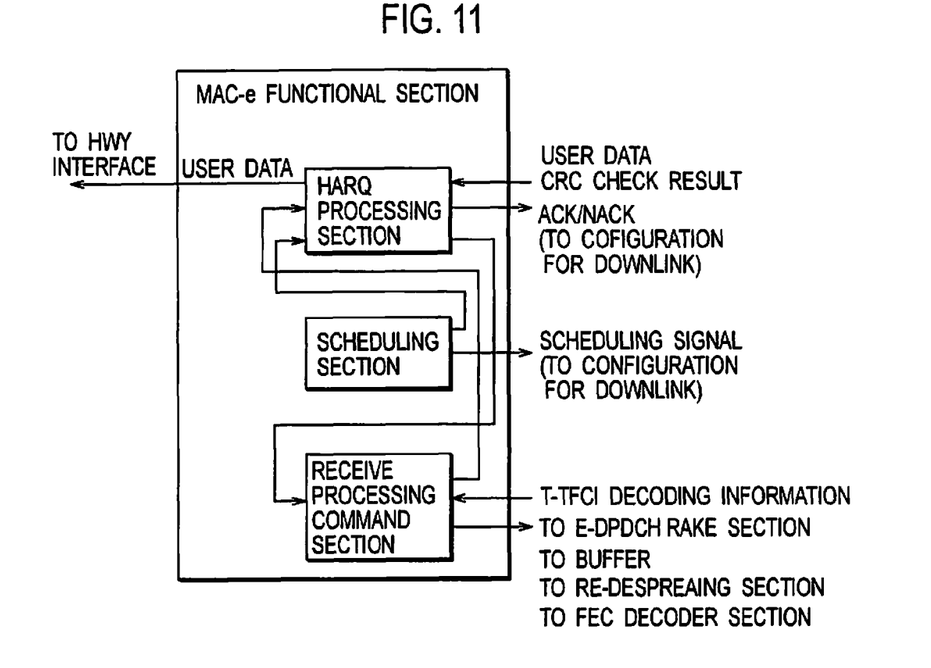
FIG. 11 is a block diagram of a MAC-e functional section according to an embodiment of the present invention.

Further, as shown in FIG. 11, a MAC-e functional section of the Mac-e and layer-1 processing section, is provided with an HARQ processing section, a scheduling section, and a receive processing command section.

The HARQ processing section is configured to notify, to the radio network controller, number of retransmissions of the transmission data blocks that include control information transmitted from the mobile station.

Specifically, when a CRC decoding result has not been successful, the HARQ processing section transmits a transmission acknowledgement signal "Nack" through the downlink and stores received soft decision information in the HARQ buffer. Further, when a CRC decoding result has been successful, the HARQ processing section transmits a transmission acknowledgement signal "Ack" through the downlink and notifies, to the radio network controller RNC, number of retransmissions of which CRC decoding result has been successful. Then, the radio network controller RNC determines, based on the notified number of retransmissions, a target SIR of the DPCCH in the radio base station, and a transmission wave amplitude ratio between the E-DPDCH and the DPCCH and notifies, to the radio base station, the determined target SIR and the transmission wave amplitude ratio.

Figure 12:
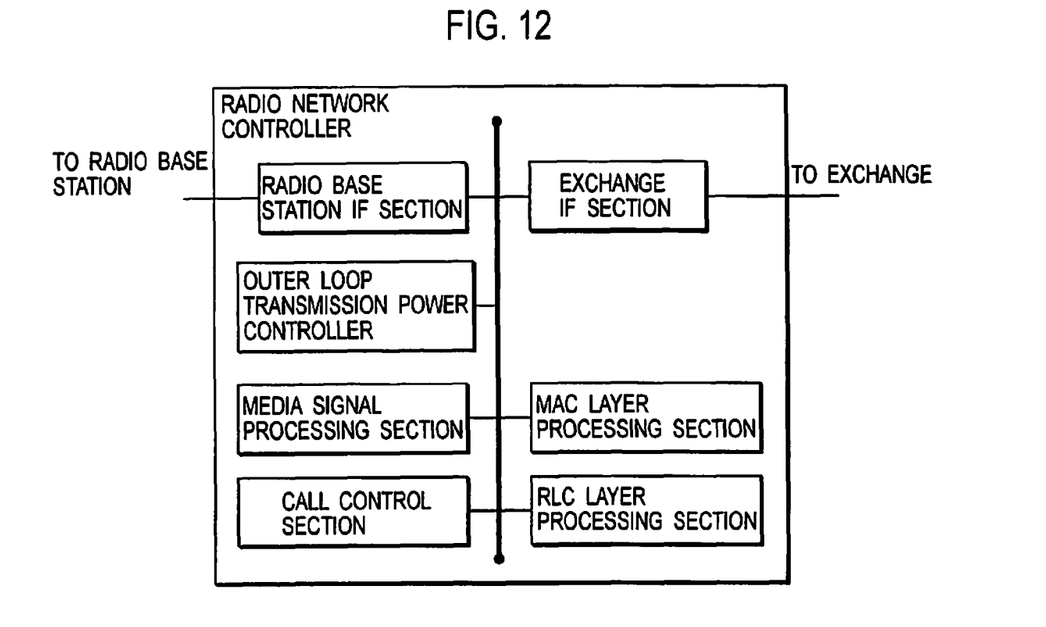
FIG. 12 is a block diagram of a radio network controller according to an embodiment of the present invention.
Figure 13:
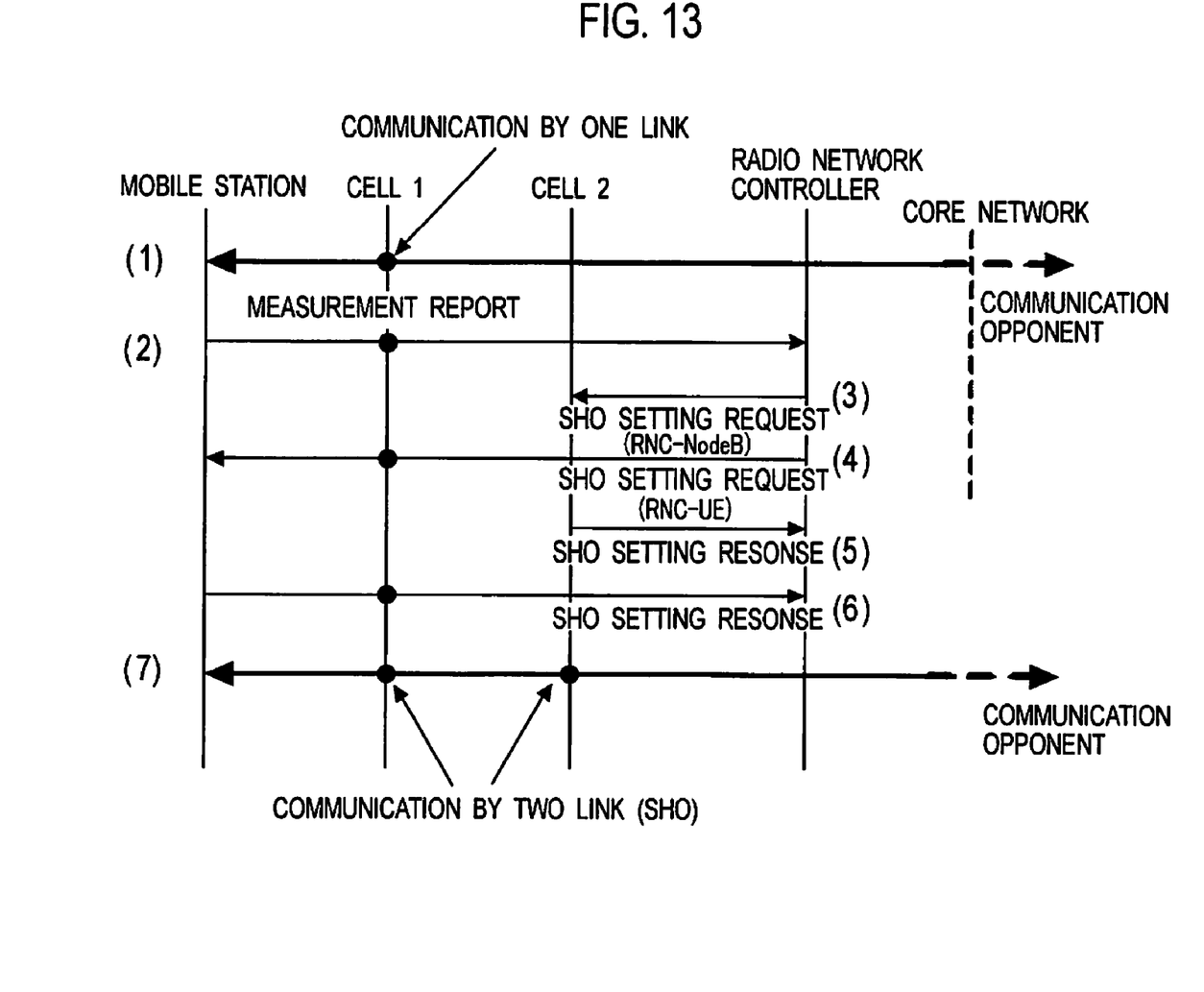
FIG. 13 is a sequence diagram showing a transmission power control method according to an embodiment of the present invention.

As shown in FIG. 12, the radio network controller is provided with a radio base station IF section, an exchange IF section, a media signal processing section, a MAC layer processing section, a call control section, an RLC layer processing section, and an outer loop transmission power control section.

The outer loop transmission power control section is configured to determine a target SIR and a gain factor based on the uplink user data transmitted from the radio base station, and the number of retransmissions of which CRC decoding result has been successful.

In other words, when the CRC result has not been successful and number of retransmissions is large, the outer loop transmission power control section instructs the radio base station to set the target SIR higher, or the outer loop transmission power control section instructs both of the radio base station and the mobile station to set the gain factor higher.

Although the present invention has been described in detail above with the embodiment, it is apparent to those skilled in the art that the present invention is not limited to the embodiment described in the present application. The apparatus of the present invention can be implemented as altered and modified embodiments without departing from the spirit and scope of the present invention as defined by the description of claims. Therefore, the description of the present application is for illustrative purposes and is not intended to limit the present invention in any way.

INDUSTRIAL APPLICABILITY

As described above, the present invention can provide a mobile communication method, a mobile station and a radio base station that makes it possible to reduce deterioration in a radio quality caused by transmission interruption of transmission data block, by generating transmission data blocks that include MAC layer control information that stores status of the mobile station (for example, availability of the transmission power, status of the buffer, or the like) and by transmitting periodically the generated transmission data block to the radio base station so as to perform periodically an outer loop transmission power control, even when user data to be transmitted is empty in a transmission buffer of the mobile station.

The invention claimed is:

1. A transmission power control method which controls a transmission power of an uplink user data channel for transmitting uplink user data from a mobile station to a radio base station, comprising:

transmitting, from the mobile station to the radio base station, a transmission data block which includes control information periodically, even when the uplink user data to be transmitted has not existed in a transmission buffer of the mobile station;

notifying, at the radio base station, the number of retransmissions of the transmission data block to a radio network controller;

determining, at the radio network controller, a target SIR of a dedicated physical control channel in the radio base station based on the notified number of retransmissions, and notifying the determined target SIR to the radio base station;

controlling, at the radio base station, a transmission power of the dedicated physical control channel in the mobile station based on the notified target SIR; and determining, at the radio network controller, a transmission wave amplitude ratio between the uplink user data channel and the dedicated physical control channel based on the notified number of retransmissions, and notifying the determined transmission wave amplitude ratio to the mobile station.

2. A mobile station used in a transmission power control method which controls a transmission power of an uplink user data channel for transmitting uplink user data from the mobile station to a radio base station, comprising:

a transmitter configured to transmit a transmission data block which includes control information to the radio base station periodically, even when the uplink user data to be transmitted has not existed in a transmission buffer; and a control section configured to control transmission power of the uplink user data channel based on a transmission wave amplitude ratio between the uplink user data channel and a dedicated physical control channel and a transmission power of the dedicated physical control channel controlled by the radio base station, the transmission wave amplitude ratio notified from a radio network controller.

3. A radio network controller used in a transmission power control method which controls a transmission power of an uplink user data channel for transmitting an uplink user data from a mobile station to a radio base station, comprising:

a notification section configured to determine, when the mobile station transmit a transmission data block which includes control information to the radio base station periodically even when the uplink user data to be transmitted has not existed in a transmission buffer of the mobile station and when the radio base station notifies the number of retransmissions of the transmission data block to the radio network controller, a target SIR of a dedicated physical control channel in the radio base station based on the notified number of retransmissions, to notify the determined target SIR to the radio base station, to determine a transmission wave amplitude ratio between the uplink user data channel and the dedicated physical control channel based on the notified number of retransmissions, and to notify the determined transmission wave amplitude ratio to the mobile station.

* * * * *